Nov. 17, 1953 R. G. THOMPSON 2,659,652

HIGH-SPEED MULTIPLEX RECORDING APPARATUS

Filed July 18, 1950 2 Sheets-Sheet 1

RUSSELL G. THOMPSON
Inventor

By Daniel J. Mayne
Lolla N. Carter

Attorneys

Nov. 17, 1953 R. G. THOMPSON 2,659,652

HIGH-SPEED MULTIPLEX RECORDING APPARATUS

Filed July 18, 1950 2 Sheets-Sheet 2

RUSSELL G. THOMPSON
Inventor

By Daniel J. Mayne
Rolla N. Carter
Attorneys

Patented Nov. 17, 1953 2,659,652

UNITED STATES PATENT OFFICE 2,659,652

HIGH-SPEED MULTIPLEX RECORDING APPARATUS

Russell G. Thompson, Rochester, N. Y., assignor to Eastman Kodak Company, Rochester, N. Y., a corporation of New Jersey Application July 18, 1950, Serial No. 174,423

7 Claims. (Cl. 346—50)

The present invention relates to signaling and more particularly to the high speed recording of facsimile or coded messages upon a record surface.

The primary object of the invention is to provide an apparatus for producing visible characters from a plurality of character-forming signals received successively in groups.

Another object of the invention is to provide multiplex facsimile apparatus wherein a plurality of printing styli are arranged close together in a row for parallel scanning and are independently and simultaneously vibrated in accordance with received signals by individual electromagnetic drivers.

Another object of the invention is to provide a multiple styli printer actuated by a translating device comprising a plurality of vibrators polarized by the flux in a single magnetic circuit.

Another object of the invention is to provide an electromagnetic translating device having two alined airgaps and having an armature extending into one of the airgaps and a core centered in the other airgap whereby the armature is pivoted outside the device.

Other objects of the invention including the provision of a compact, efficient, high-speed multiple styli recording device will become apparent from the following description of apparatus embodying the invention when read in connection with the accompanying drawings in which.

The recorder according the preferred form of the invention comprises a plurality of styli arranged in a row and adapted to be actuated by individual electromagnetic drivers sharing a common magnetic circuit and so mounted that the motion from each driver to its associated stylus is transmitted in a single plane and without twist.

The signals for actuating the drivers may be obtained by scanning characters or may be produced synthetically by any suitable means to provide properly timed pulses in predetermined combinations so that as a recording medium is fed transversely past the row of styli it will be marked to build up the character corresponding to the received signals.

Figure 1:
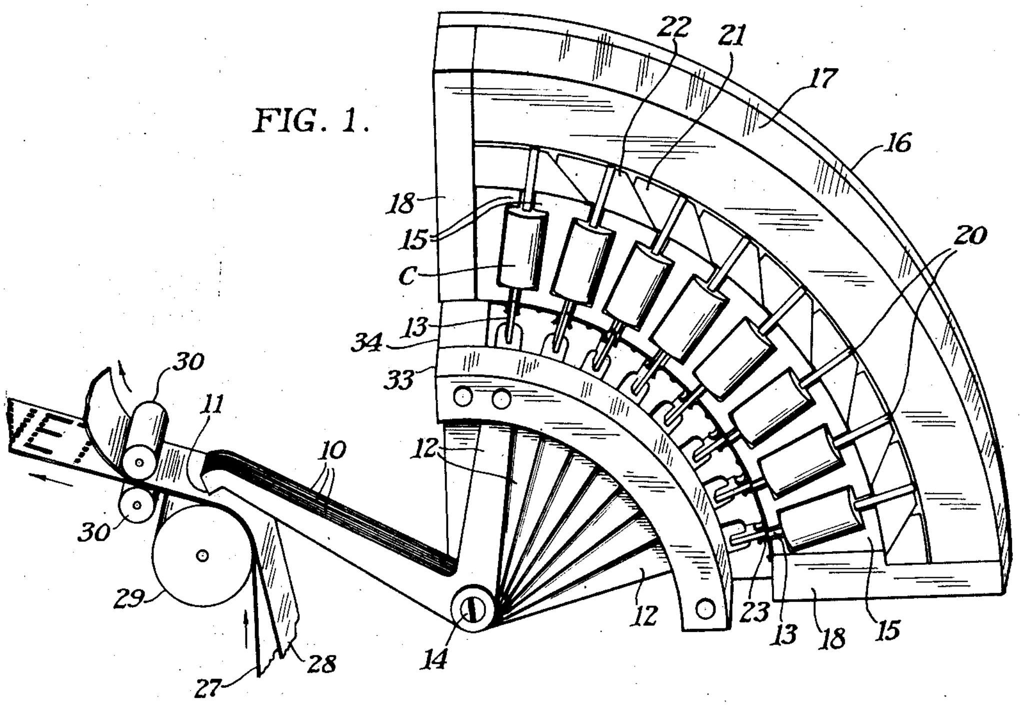
Fig. 1 is a view in perspective of a recorder constructed in accordance with the invention.

For recording a single line of characters it has been found that seven-line definition produces very satisfactory results and for the purpose of illustrating the invention eight styli arranged in a row for parallel scanning are shown in Fig. 1, although the invention is not restricted to any specific number of recording elements. One reason eight styli are chosen for recording seven-line definition is to compensate for possible unevenness of a line of characters being scanned at a transmitter from which the recorder receives its signals. That is, although the characters being scanned are the height of seven pickup scanning elements, eight such scanning elements are employed so that a slight lateral shift in the characters being scanned can be tolerated. If the received signals are derived from code wheels or the like then only seven styli need be employed.

The recorder shown in Fig. 1 comprises eight printing bars 10 provided with printing points or styli 11 arranged in a row. Each of the printing bars 10 is an arm of a bell crank lever, the other arm 12 of which is provided with an armature 13 and all of the levers are pivotally mounted on a suitable rod 14 for oscillatory movement about a common axis. The bell crank levers are made from thin flat stock and are assembled in adjacent parallel planes so that movement of the armatures 13 in these planes is transmitted without twist to the recording points 11.

In an operating embodiment the bell crank levers comprised of the printing arms 10 and the operating arms 12 are .02 inch thick and in order to accomodate individual vibrators for the several armatures 13 the angles made by the arms 10 and 12 differ progressively by a given amount so that with the printing arms 10 in a plane normal to the plane of the bell crank levers the operating arms 12 are fanned out about the pivot rod 14. Electromagnetic vibrator pole pieces 15 mounted on a main frame 16 of nonmagnetic material with their airgaps radially alined with the respective operating arms 12 share a common magnetic flux which may be provided by a permanent magnet 17 and its associated yokes 18 of magnetic material. The vibrator pole pieces 15 are laminated and preferably made from high frequency electric sheet steel. Also, the pole members 15 are preferably mounted on different levels to correspond to the levels of the operating arms 12 and this may conveniently be done by machining steps 19 (see Fig. 2) of the proper height on the main frame 16. A core or stationary armature 20 is centered by nonmagnetic fittings 21 and 22 in one of the airgaps of each vibrator and extends towards the other airgap in which the armature tip 13 of the operating arm 12 is suitably centered as by leaf springs 23 of nonmagnetic material which may be secured to the exposed ends of the laminated poles 15. The armatures 13, which are of course magnetic, are secured to the ends of the nonmagnetic operating arms 12 in any suitable manner as by brazing or welding. The adjacent ends of the cores 20 and the movable armatures 13 should form as narrow an airgap as possible.

Each stationary armature or core 20 is surrounded by two activating coils C energized, respectively, through suitable leads 24 and 25, and 24 and 26 (see Figs. 3 and 4) to move the armature 13 in either of two directions to raise or lower the printing arms 10. This is a push-pull arrangement, one of the coils carrying current on white, no current on black; the other coil carrying current only on black. The flux $\phi p$ supplied by the permanent magnet 17 passes through the yokes 18 and serially through the pole pieces 15 and, since the airgaps are the same between the poles 15 and the cores 20 and the poles 15 and the armatures 13, the flux $\phi p$ divides equally between the two pairs of pole faces of each vibrator. When there is no current in either of the coils C practically no flux passes radially through the pole pieces 15 or the cores 20.

Current in either of the coils C in any vibrator produces a flux $\phi c$ in the core 20 and the armature 13 and $\frac{1}{2}c$ in the core 20 and the armature 13 and $\frac{1}{2}\phi c$ in each adjacent pole piece 15 comprising such vibrator. With this arragement it is well understood that the armature 13 will be moved to raise or lower its associated printer bar 10 depending upon the direction of the flux $\phi c$ which, of course, depends upon the direction of the energizing current in a coil C. Thus, the application of suitable signal currents to the coils C will selectively raise or lower the printer bars 10 and their styli 11 to record the characters represented by the signal currents on a suitable recording medium, such as a paper tape 27 and an overlying strip of carbon paper 28, which is moved transversely to and between the row of styli 11 and a solid surface (shown in Fig. 1 as comprising a drum 29) in any suitable manner as by rollers 30 actuated by mechanism, not shown, to advance the recording medium in the desired time relation with the received signals. This relation is not critical because for a given signal rate any variation in the speed of movement of the recording medium above or below an assumed ideal speed will merely result in a lengthening or foreshortening of the character in the direction of movement.

Figure 3:
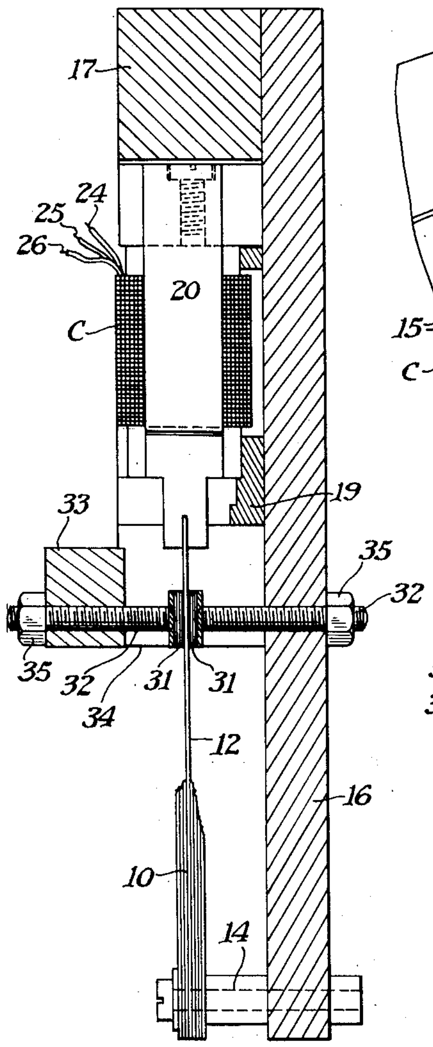
Fig. 3 is a section along the line 3—3 in Fig. 2.
Figure 4:
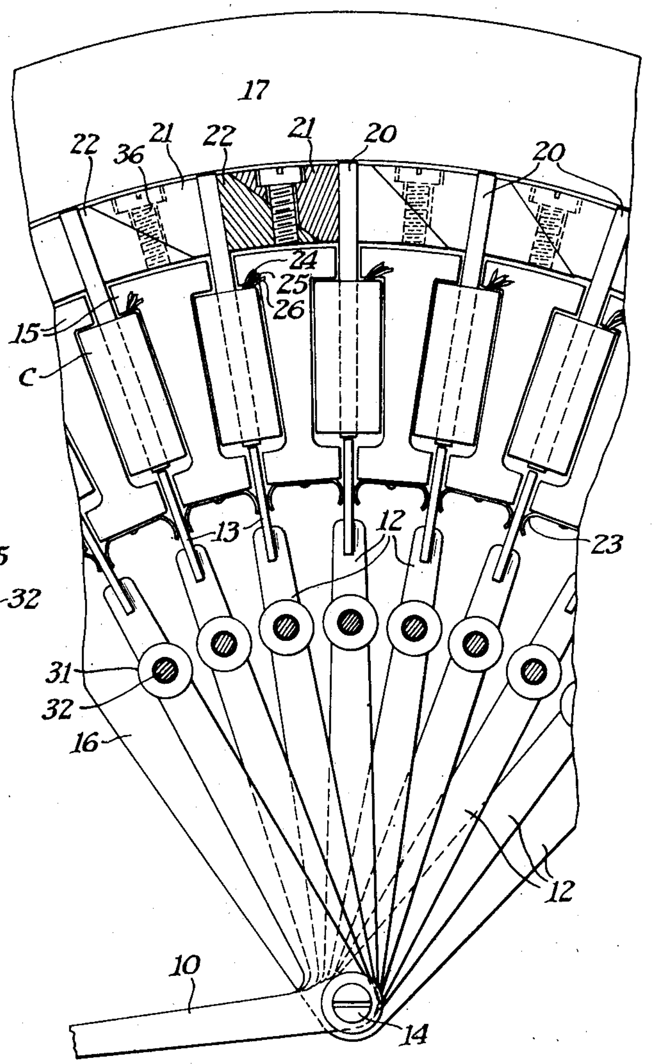
Fig. 4 is a partial view partly in section of a representative portion of the vibrator units of the electromagnetic driver of Figs. 1–3.

Referring now to Figs. 3 and 4, rebound of the printer arms 10 is prevented by dampening which may conveniently be accomplished by means of felt pads 31 pressed against opposite sides of each operating arm 12 by stud screws 32 in threaded engagement, respectively, with the main frame 16 and an arcuate yoke 33 spaced from and secured to the main frame 16 by blocks 34. The pressure on the pads 31 is adjustable by turning the screws 32 which may be held in adjusted position by suitable lock nuts 35.

The nonmagnetic fittings 21 and 22 for clamping the cores 20 are shown in more details in Fig. 4. The fitting 21 is integral with or rigidly secured to the main frame 16 with its radial face accurately located for positioning one side of the core 20, the other side of which is engaged by the radial face of the fitting 22. The contacting surfaces of the fittings 21 and 22 are inclined with respect to their radial faces so that a screw 36 passing freely through the piece 21 and threaded in the piece 22 will when tightened force the radial face of the piece 22 firmly against the core 20.

Figures 2, 5:
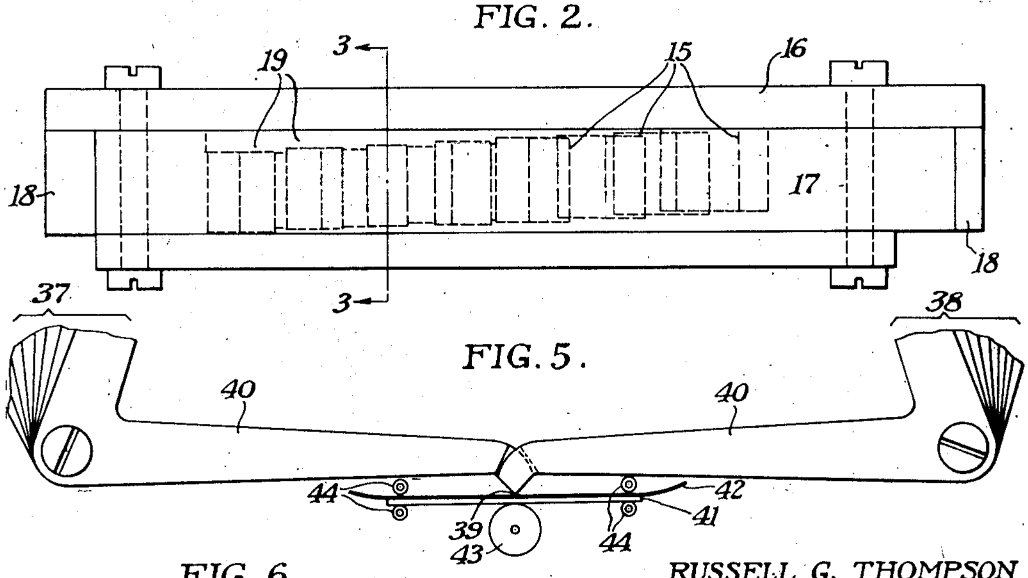
Fig. 2 is a top plan view with a part broken away of the electromagnetic driver of Fig. 1.
Figs. 5 and 6 are partial side and top views, respectively, of printing arms having their styli ends interleaved to increase definition while using sturdy printing arms.
Figure 6:
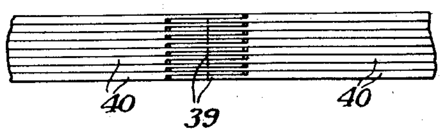

A modified arrangement shown in Figs. 5 and 6 makes it possible to record greater definition while retaining the desired sturdiness. As here shown, two recording units 37 and 38, similar to the one described above, are arranged on opposite sides of the recording line with their styli 39 interleaved. Preferably the interleaved portions of the printing arms 40 on which the styli are formed are reduced in thickness to permit a greater number of printing elements per inch and still allow the use of sturdy printing arms 40. Also, as shown in Fig. 5, the recorder according to the invention may be used to print on thick flat stock such as tabulating cards by advancing a card 41 and a carbon paper 42 over a platen such as printing roller 43 and beneath the styli 39 at the desired rate by any suitable means such as two pairs of feed rollers 44.

It is preferred to use flat sheet stock for forming the bell cranks and to assemble the bell cranks in sliding engagement with one another so as to provide a certain amount of mutual lateral support. However, if desired, thin spacers may be inserted between the several bell cranks.

It will be noted that the several bell cranks are identical, except for the angle between their arms, so as to have the same weight and the same moment of inertia. This makes possible uniform print results since the application of equal forces to the several armatures 13 will produce equal acceleration in the printing arms 10 and thus the impact of each printing element or styli 11 on the carbon paper is the same, the slight differences due to gravity being ignored. It is important to uniform printing that the radius of gyration around the common axis be the same for each bell crank.

It is to be understood that the term "bell crank" is used in a broad sense to include a rocker, i. e., the two arms make an angle greater than 90 degrees, and that several recording units may be arranged in groups, one unit for each line or column to be recorded, so that several lines of characters may be recorded simultaneously.

While for the purpose of describing the invention a specific embodiment has been disclosed in detail, it will be obvious to those skilled in the art that various modifications will suggest themselves without departing from the scope of the invention as pointed out in the appended claims.

What I claim as new and desire to secure by Letters Patent of the United States is:

1. Multiple styli recording apparatus comprising a plurality of thin bell crank levers assembled in adjacent parallel planes for pivotal movement about a common axis, a stylus carried by the end of one arm of each bell crank lever, the lever arms carrying the styli occupying a plane which includes said common axis and the angle made by the two arms of each bell-crank lever being different from all the others such that the other arms of the bell crank levers are radially and angularly disposed with respect to said common axis, and a plurality of electromagnetic devices associated with said other arms, respectively, for independently oscillating the bell crank levers about their common axis.

2. The apparatus claimed in claim 1 wherein the electromagnetic devices are vibrators disposed on a circular arc centered in said common axis and polarized by the same magnetic flux.

3. Recording apparatus comprising a plurality of bell-crank levers adapted to be assembled for pivotal movement about a common axis, each lever having two arms arranged in the same plane and the included angle between the arms of said levers differing progressively by equal amounts, means for supporting the levers in adjacent parallel planes for oscillatory movement about said common axis and with one arm of each lever aligned whereby the other arms are fanned out equiangularly, a plurality of styli carried, respectively, by the aligned arms of said levers to provide a row of recording elements, means for moving a recording medium transversely and in cooperative relation to the row of recording elements, and a plurality of independently and simultaneously controllable electromagnetic devices having a common polarizing flux for selectively oscillating the bell crank levers in accordance with received signals.

4. In apparatus for recording a plurality of signals simultaneously, a platen member, a plurality of styli arranged in a row parallel to the platen member, a plurality of bell-crank levers supporting, respectively, the styli and assembled in adjacent parallel planes for oscillation about a common axis parallel to the row of styli, a plurality of vibrators disposed on a circular arc centered in the common axis and each having pole pieces defining a pair of airgaps radially alined with respect to the common axis, an armature carried by one of the bell-crank levers extending into one of the airgaps of each vibrator, a core centered in the other airgap of each vibrator, a separate energizing coil for each vibrator, and a permanent magnet mounted to provide a polarizing flux which passes serially through all of the vibrator pole pieces.

5. A high speed facsimile carbon paper recorder comprising a plurality of signal responsive elements equiangularly spaced in echelon fashion along a segment of a helix having a pitch such that the longitudinal length of the segment equals the width of a character to be recorded, a plurality of recording elements arranged in a row parallel to and mounted for oscillation about the axis of the helical segment, actuating means operatively connected to the recording elements and movable by the signal responsive elements, respectively, for independently oscillating the recording elements, a platen adjacent the row of recording elements, and means for advancing a recording medium between the platen and the recording elements in a direction transverse to the row of recording elements.

6. Recording apparatus of the type in which a plurality of styli arranged in a row are carried by bell cranks which are selectively oscillated by electromagnetic drivers individual to each bell crank characterized by alternate styli in the row being carried by oppositely extending bell cranks.

7. The apparatus claimed in claim 6 wherein the interleaved ends of the bell cranks are shaped to constitute the styli and have a dimension in the direction of the row substantially one half the dimension of the bell cranks whereby the bell cranks and their interleaved ends are in free sliding engagement and the recording definition is doubled without sacrificing sturdiness in the bell cranks.

RUSSELL G. THOMPSON.

References Cited in the file of this patent

UNITED STATES PATENTS

| Number | Name | Date |
|---|---|---|
| 1,364,227 | Wight | Jan. 4, 1921 |
| 1,925,515 | Beck | Sept. 5, 1933 |
| 2,002,686 | Belaef | May 28, 1935 |
| 2,502,811 | Willing et al. | Apr. 4, 1950 |
| 2,526,685 | Price | Oct. 24, 1950 |